United States Patent
Singh et al.

(10) Patent No.: US 12,475,326 B2
(45) Date of Patent: Nov. 18, 2025

(54) GENERATING CONTENT HIGHLIGHTING WORK EXPERIENCE USING A GENERATIVE MODEL

(71) Applicant: Maplebear Inc., San Francisco, CA (US)

(72) Inventors: Aakash Singh, Toronto (CA); Ajay Pankaj Sampat, San Francisco, CA (US); Hannah Gardner, Toronto (CA); Fangzhou Wang, Oakland, CA (US); Jaclyn Tandler, San Francisco, CA (US); Bryan Tran, Brooklyn, NY (US); Sai Kannan Sampath, Berkeley, CA (US)

(73) Assignee: Maplebear Inc., San Francisco, CA (US)

( * ) Notice: Subject to any disclaimer, the term of this patent is extended or adjusted under 35 U.S.C. 154(b) by 181 days.

(21) Appl. No.: 18/522,012

(22) Filed: Nov. 28, 2023

(65) Prior Publication Data

US 2025/0173517 A1    May 29, 2025

(51) Int. Cl.
*G06F 40/40*      (2020.01)
*G06F 40/186*     (2020.01)
*G06Q 10/105*     (2023.01)

(52) U.S. Cl.
CPC ............ *G06F 40/40* (2020.01); *G06F 40/186* (2020.01); *G06Q 10/105* (2013.01)

(58) Field of Classification Search
CPC ...... G06F 40/40; G06F 40/186; G06Q 10/105
See application file for complete search history.

(56) References Cited

U.S. PATENT DOCUMENTS

| | | | | |
|---|---|---|---|---|
| 9,495,962 | B2* | 11/2016 | Govrin | G06Q 40/02 |
| 9,953,007 | B2* | 4/2018 | Oyarzabal | G06F 40/103 |
| 10,276,170 | B2* | 4/2019 | Gruber | G06F 16/9537 |
| 2014/0040748 | A1* | 2/2014 | Lemay | G06F 16/9562 |
| | | | | 715/728 |
| 2017/0371868 | A1* | 12/2017 | Zhang | G06F 40/44 |
| 2018/0068031 | A1* | 3/2018 | Hewavitharana | G06F 9/30156 |
| 2018/0143967 | A1* | 5/2018 | Anbazhagan | G10L 15/22 |
| 2018/0165596 | A1* | 6/2018 | Abrams | G06N 3/006 |

(Continued)

OTHER PUBLICATIONS

The Influence of Warehousing and Order Fulfilment on Customer Satisfaction in E-Commerce (Year: 2022).*

*Primary Examiner* — Mohammad K Islam
(74) *Attorney, Agent, or Firm* — Fenwick & West LLP

(57) ABSTRACT

An online system receives orders including items from customers and allocates the orders to pickers. A picker obtains items included in an order from a customer and delivers the items to the customer to fulfill the order. To provide encouragement for pickers fulfilling orders, the online system generates a highlight reel of accomplishments of a picker fulfilling orders. The online system generates prompts for a generative model, such as a large language model, based on stored information describing order fulfillment by a picker. Content, such as text, generated in response to a prompt by the generative model includes one or more portions of the stored information describing order fulfillment is included in the highlight reel. A template for the highlight reel is selected for the picker, with the template identifying content displayed to the picker and an order in which the content is displayed.

20 Claims, 5 Drawing Sheets

(56) References Cited

U.S. PATENT DOCUMENTS

| | | | |
|---|---|---|---|
| 2018/0196683 A1* | 7/2018 | Radebaugh | G06F 3/167 |
| 2018/0261203 A1* | 9/2018 | Zoller | G06F 40/284 |
| 2018/0314689 A1* | 11/2018 | Wang | G10L 15/1822 |
| 2019/0027147 A1* | 1/2019 | Diamant | G10L 15/22 |
| 2019/0065498 A1* | 2/2019 | Yuan | G06F 16/24522 |
| 2019/0065556 A1* | 2/2019 | Kumar | G06F 16/3329 |
| 2019/0130286 A1* | 5/2019 | Salameh | G06N 5/022 |
| 2019/0156222 A1* | 5/2019 | Emma | G06N 5/041 |
| 2019/0236464 A1* | 8/2019 | Feinson | G06N 3/006 |
| 2019/0279627 A1* | 9/2019 | Wang | G06F 16/632 |
| 2019/0279633 A1* | 9/2019 | Venkata | G06F 16/632 |
| 2023/0229865 A1* | 7/2023 | Dhotre | G06F 16/24522 |
| | | | 704/9 |
| 2024/0330718 A1* | 10/2024 | Tan | G06N 3/08 |
| 2025/0085836 A1* | 3/2025 | Chan | G06N 20/00 |

\* cited by examiner

GENERATING CONTENT HIGHLIGHTING WORK EXPERIENCE USING A GENERATIVE MODEL

BACKGROUND

Online concierge systems receive orders for items from customers and allocate the orders to pickers, who fulfill the orders. To fulfill an order from a customer, a picker to whom the order was allocated obtains items in the order from a retailer. Subsequently, the picker delivers the obtained items to a location included in the order by the customer. Over time, as pickers fulfill orders for an online concierge system, the pickers may feel underappreciated. For example, conventional online concierge systems provide little or no information to a picker emphasizing a number of orders fulfilled by the picker, positive feedback customers provided about the picker, or other achievements of the picker when fulfilling orders. This lack of recognition for order fulfillment by a picker may decrease subsequent interaction with the online concierge system by the picker, reducing a number of orders capable of being fulfilled by the online concierge system.

To encourage a picker to continue fulfilling orders for the online concierge system or to fulfill a greater number of orders, it may be beneficial to provide the picker with personalized content highlighting aspects of the picker's previous order fulfillment. However, as a number of pickers fulfilling orders for the online concierge system increases, an amount of data describing order fulfillment by individual pickers and an overall amount of data describing order fulfillment by pickers maintained by the online concierge system increases. The increased data describing order fulfillment increases an amount of computational resources and an amount of time for the online concierge system to create personalized content for a picker describing order fulfillment by the picker, making manual generation of personalized content about prior order fulfillment for individual pickers impractical.

SUMMARY

In accordance with one or more aspects of the disclosure, an online concierge system receives various orders from customers. Each order includes one or more items, identifies a retailer from which the one or more items are to be obtained, and identifies a location for delivering the one or more items included in the order. Additionally, the online concierge system associates each order with a customer from whom the order was received.

The online concierge system allocates orders to various pickers. A picker to whom an order is allocated obtains items included in the order from a retailer identified by the order and delivers the obtained items to a location specified by the order. The online concierge system stores information describing order fulfillment of an order in association with a picker who fulfilled the order. The online concierge system stores various information describing order fulfillment in association with a picker who fulfilled the order. Example information describing order fulfillment includes: items included in an order fulfilled by the picker, a number of items included in the order fulfilled by the picker, item categories of items included in the order fulfilled by the picker, a retailer from which the picker fulfilled the order, a geographic region in which the picker fulfilled the order, or other information describing the order. Additionally, information describing order fulfillment by the picker includes information describing a customer's reaction to fulfillment of the order by the picker. Example information describing the customer's reaction to order fulfillment by a picker includes a rating the customer provided the picker for fulfilling the order, a comment the customer provided about the picker fulfilling the order, or other feedback from the customer about order fulfillment by the picker.

As a number of orders received by the online concierge system increases, pickers fulfill a greater number of orders, and a number of pickers fulfilling orders may also increase. Increases in a number of orders fulfilled by a picker and increases in a number of pickers increase an amount of information describing order fulfillment stored by the online concierge system for pickers. The online concierge system may provide content to pickers about order fulfillment by the pickers to encourage continued interaction with the online concierge system by pickers. Such content may identify significant achievements by a picker when fulfilling orders, providing the picker with positive feedback that entices the picker to continue fulfilling orders for the online concierge system or to fulfill a greater number of orders for the online concierge system. However, as an amount of information describing order fulfillment by pickers increases, the online concierge system consumes more time and more computational resources to create content for a picker from the information describing order fulfillment by the picker.

In various embodiments, the online concierge system provides a highlight reel displaying different portions of the information describing order fulfillment stored in association with a picker to the picker. The online concierge system selects a picker and generates a highlight reel for the selected picker. In various embodiments, the online concierge system selects a picker at a specific time or in response to characteristics associated with the picker satisfying one or more criteria. For example, the online concierge system selects a picker on a specific date. In another example, the online concierge system selects a picker in response to at least a threshold time interval lapsing from prior generation of a highlight reel for the picker. As another example, the online concierge system selects a picker at a periodic interval (e.g., selects the picker each month, selects the picker each year, etc.).

In various embodiments, the online concierge system selects a picker in response to characteristics of the picker satisfying one or more criteria. For example, the online concierge system selects the picker in response to a model determining the picker has less than a threshold probability of fulfilling subsequent orders. As another example, the online concierge system selects a picker in response to determining the picker has performed less than a threshold amount of interaction with the online concierge system during a time interval. For example, the online concierge system selects a picker in response to determining the picker has spent less than a threshold amount of time fulfilling orders within a time interval. As another example, the online concierge system selects a picker in response to the online concierge system receiving a specific type of feedback about the picker from customers or in response to receiving a threshold amount of the specific type of feedback about the picker from customers.

To generate the highlight reel for the selected picker, the online concierge system maintains a set of templates for the highlight reel and selects a template for the selected picker in various embodiments. Each template includes one or more frames, with each frame displaying a portion of information describing order fulfillment stored in association with the selected picker. Different frames display different portions of information describing order fulfillment stored in association with the selected in various embodiments. Different templates include frames displaying different portions of information, or different templates display frames in different orders. Maintaining different templates allows the online concierge system to vary how information describing order fulfillment is displayed to the selected picker or to different pickers.

One or more frames of a template may include a corresponding threshold. In various embodiments, the online concierge system determines whether a portion of the information describing order fulfillment stored in association with a picker for display in a frame equals or exceeds the threshold included in the frame. In response to determining the portion of the information describing order fulfillment stored in association with a picker for display in a frame is less than a threshold included in the frame, the online concierge system omits the frame from a generated highlight reel in some embodiments or omits the portion of the information describing order fulfillment stored in association with a picker from display in the frame via the generated highlight reel. This allows the online concierge system to limit information describing order fulfillment stored in association with a picker included in a highlight reel to information exceeding a corresponding threshold.

In various embodiments, the online concierge system associates a set of characteristics of a picker with each stored template. Different sets of characteristics are associated with different templates in various embodiments. For example, a template is associated with a particular time interval that a picker has fulfilled orders for the online concierge system, while an alternative template is associated with an alternative time interval that the picker has fulfilled orders for the online concierge system. As another example, a template is associated with a particular geographic location, while an alternative template is associated with a different geographic location. This allows the online concierge system to select different templates for different pickers based on corresponding characteristics of a picker, tailoring content included in a highlight reel based on characteristics of the picker. In various embodiments, the selected template is associated with a set of characteristics including at least a threshold amount of characteristics matched by characteristics of the selected picker. As another example, the selected template is associated with a set of characteristics including a maximum amount of characteristics matched by characteristics of the selected picker.

As a number of pickers fulfilling orders increases, creating content for a highlight reel that is personalized to a picker is increasingly time and resource intensive. To efficiently generate content personalized for the selected picker, the online concierge system generates one or more prompts for a generative model based on the selected template and information describing order fulfillment stored in association with the selected picker. The generative model generates content for inclusion in a highlight reel based on the prompt and information describing order fulfillment by the selected picker. In various embodiments, the generative model is a large language model trained on a text corpus or is a generative image model trained on a corpus of images. A prompt generated for the generative model includes a subset of the information describing order fulfillment by the selected picker from which the generative model generates content. In one or more embodiments, a prompt includes one or more criteria for content and a subset of information describing order fulfillment by the selected picker, and the generative model generates content based on the subset of information describing order fulfillment by the selected picker included in the prompt subject to the one or more criteria included in the prompt. For example, a prompt includes feedback received from customers for the selected picker and criteria to select the most positive feedback. As another example, a prompt includes orders fulfilled by the selected picker during a specific time interval and criteria to select an item included in a maximum number of the included orders.

In various embodiments, the content generated by the generative model is text including a portion of the information describing order fulfillment by the selected picker. For example, the content is text including a portion of the information describing order fulfillment by the selected picker satisfying one or more criteria included in a prompt. As another example, the content generated by the generative model is an image based on the subset of information describing order fulfillment by the selected picker included in the prompt. Generating different prompts for different frames in the selected template allows the online concierge system to display different portions of the information describing order fulfillment by the selected picker in the highlight reel. Additionally, leveraging the generative model to generate content for the highlight reel allows the online concierge system 140 allows the online concierge system to generate content 440 more efficiently, enabling the online concierge system to generate content 440 for highlight reels for a greater number of pickers.

From the content generated by the generative model and the selected template, the online concierge system generates the highlight reel for the selected picker. When generating the highlight reel, the online concierge system includes content in a frame that was generated for the frame based on a prompt for the frame in the selected template to populate frames of the selected template with corresponding generated content. For a frame of the selected template including a threshold, the online concierge system compares the portion of the information describing order fulfillment by the selected picker in the content for the frame to the threshold. In response to the portion of the information describing order fulfillment by the selected picker in the content for the frame being less than the threshold, the online concierge system omits the frame from the highlight reel or omits the portion of the information describing order fulfillment by the selected picker from the frame. Hence, thresholds included in various frames of the selected template allow the online concierge system to customize the highlight reel to display information describing order fulfillment by the selected picker exceeding various thresholds. Based on this customization, the highlight reel displays portions of the information describing order fulfillment by the selected picker representing significant or positive occurrences from order fulfillment. This allows the highlight reel to encourage the selected picker to continue fulfilling orders for the online concierge system based on prior fulfillment of orders by the selected picker, increasing a likelihood of the selected picker fulfilling additional orders for the online concierge system.

In various embodiments, the online concierge system receives information describing interaction with the highlight reel by the selected picker and modifies subsequent generation of one or more prompts for the generative model based on the selected picker's interaction with the highlight reel. For example, in response to the selected picker viewing a frame for at least a threshold amount of time, the online concierge system stores a positive label for a prompt generated for the frame to increase a likelihood of a similar prompt being generated. Alternatively, in response to the selected picker viewing a frame for less than an additional threshold amount of time, the online concierge system stores a negative label for a prompt generated for the frame to reduce a likelihood of the online concierge system generating a similar prompt. This allows the online concierge system to modify generation of prompts for frames of a template over time based on how pickers interact with content generated based on various prompts.

DETAILED DESCRIPTION

Figure 1:
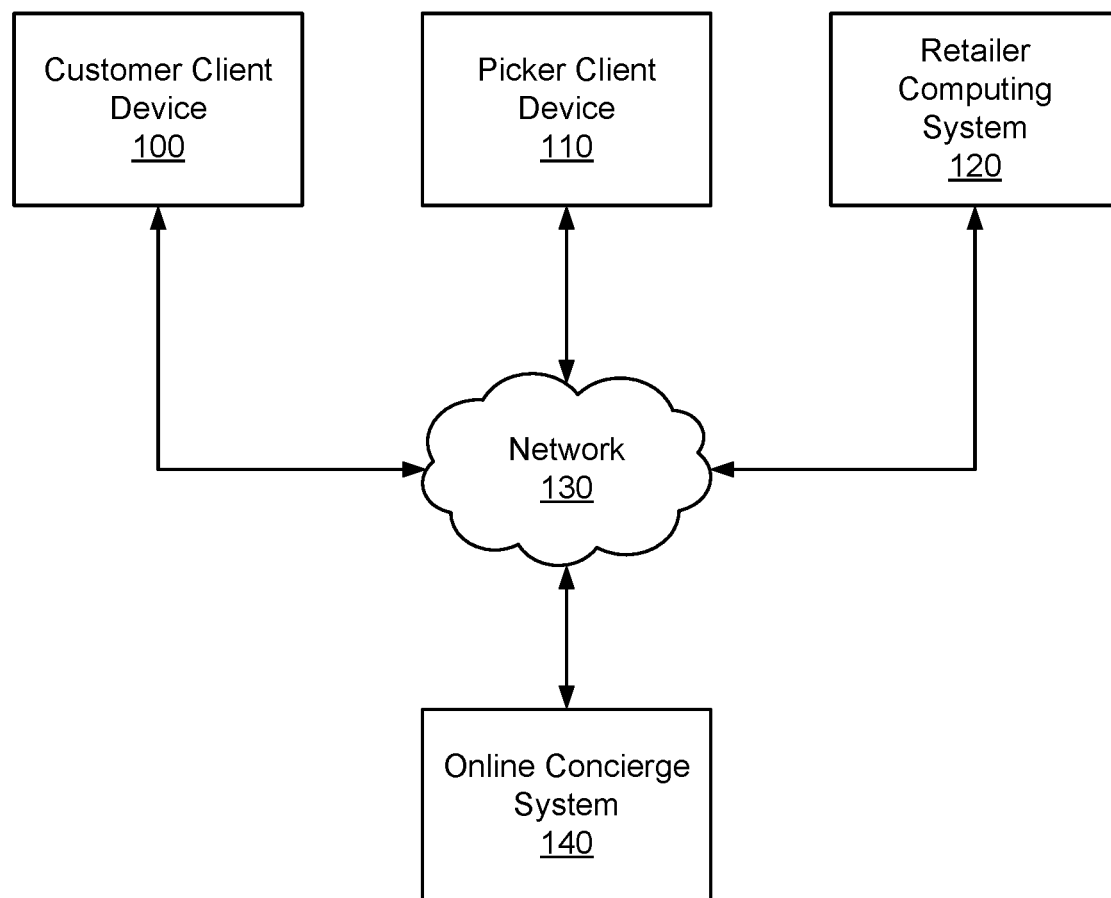
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item," as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
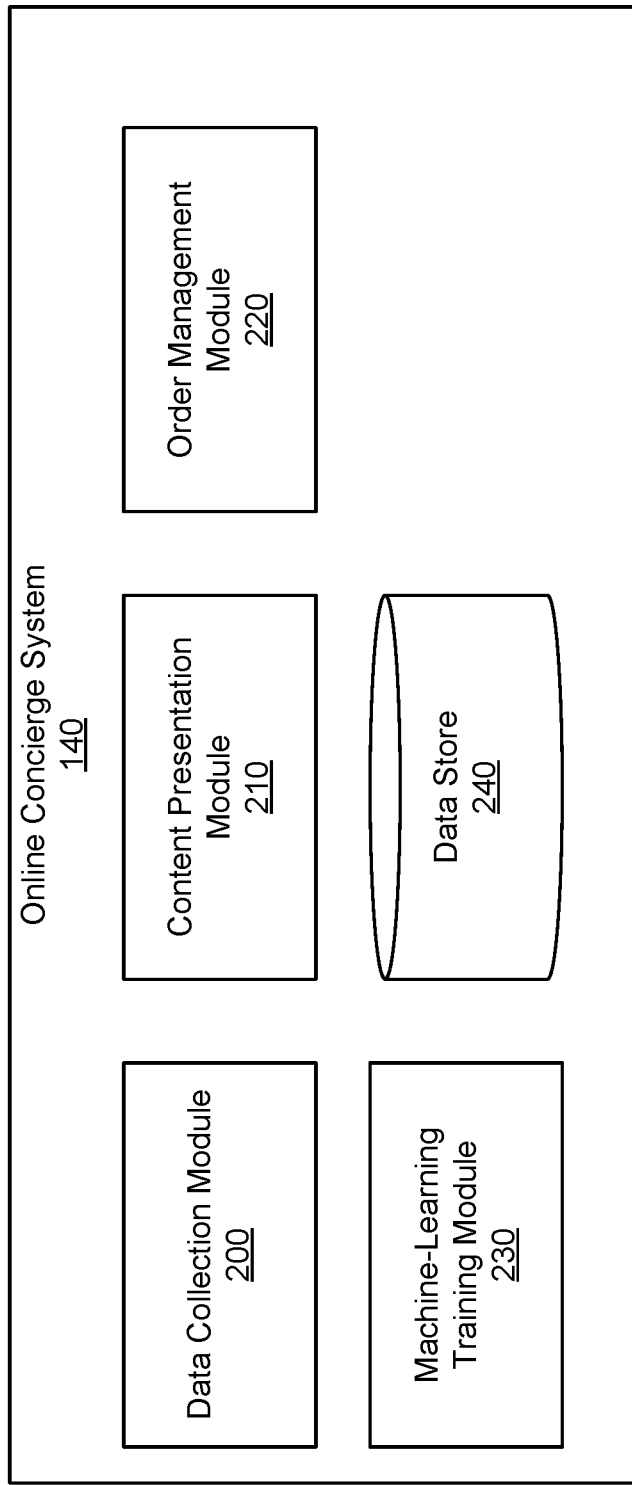
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

In various embodiments, the picker data also includes information describing prior order fulfillment by different pickers. For example, the data collection module 200 collects information for a picker describing order fulfillment of an order by the picker and stores the information in association with the picker. Example information describing order fulfillment of an order includes: a number of items included in the order, a number of items the picker obtained for the order, a retailer from which the order was fulfilled, item categories of items included in the order, a quantity of each item obtained for the order, a geographic region in which the order was fulfilled, feedback about fulfillment of the order received from a customer from whom the order was received, and other information about the order or about a customer's assessment or order fulfillment. In various embodiments the data collection module 200 obtains information describing each order fulfilled by a picker and stores the information describing order fulfillment in association with an identifier of the picker in the data store 240 to maintain a record of order fulfillment by the picker.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The content presentation module 210 generates a summary interface for a picker based on information describing prior order fulfillment by the picker. The summary interface is a highlight reel displaying different portions of information describing prior order fulfillment by the picker in various embodiments. The portions of information describing order fulfillment may be based on order fulfillment by the picker during a specific time interval. For example, the summary interface includes a highlight reel including different information about order fulfillment by the picker within a year from a time when the summary interface is generated, within a month of the time when the summary interface is generated, or within another time interval of the time when the summary interface is generated. To personalize content included in the summary interface, the content presentation module 210 leverages one or more generative models and the stored information describing prior order fulfillment by the picker to generate content for display in the summary interface.

In various embodiments, the highlight reel comprising the summary interface includes different frames, or pages, that each include different information about order fulfillment by the picker. For example, a frame identifies an item the picker most frequently obtained during a time interval, another frame identifies a number of distinct customers for whom the picker fulfilled orders during the time interval, an additional frame identifies a number of orders the picker fulfilled during the time interval, and other frames include different information about order fulfillment by the picker during the time interval. Additional examples of information about order fulfillment during the time interval that may be included in the highlight reel include: a retailer from which the picker fulfilled a maximum number of orders during the time interval, feedback received from one or more customers about fulfillment of orders for the customers during the time interval, a number of retailers from which the customer fulfilled orders during the time interval, one or more ratings of the picker from customers for whom the picker fulfilled orders during the time interval, an amount of time saved for customers by the picker fulfilling orders for customers, a number of orders fulfilled by the picker within corresponding time intervals specified by the orders during the time interval, or other information describing fulfillment of orders by the picker or customer feedback for order fulfillment by the picker. In some embodiments, the highlight reel may include information about order fulfillment by the picker over an extended time interval, such as over a length of time the picker has been fulfilling orders for the online concierge system 140. For example, one or more frames of the highlight reel include a total number of orders fulfilled by the picker over the extended time interval, a total number of items the picker obtained over the extended time interval, a total number of customers for whom the picker has fulfilled orders over the extended time interval, a total amount of feedback equaling or exceeding a threshold that the picker has received from customers during the extended time interval, or other information about order fulfillment over the extended time interval by the picker.

The content presentation module 210 maintains different templates for the highlight reel, or for other types of summary interfaces, in various embodiments. Different templates include different information about order fulfillment by the picker in the highlight reel or present information about order fulfillment by the picker in different orders within the highlight reel. Further, a template may include thresholds for various information about order fulfillment by the picker, limiting the highlight reel to including information about order fulfillment that equals or exceeds a corresponding threshold for a frame. Different templates may include different thresholds to vary the information about order fulfillment by the picker included in highlight reels generated from different templates. For example, a template omits a frame from a highlight reel in response to information about order fulfillment by the picker to include in the frame not equaling or exceeding a threshold included in the frame. Alternatively, a template includes a frame in the highlight reel, but does not display information about order fulfillment by the picker that does not equal or exceed the threshold included in the frame within the frame. A template may also include instructions for displaying the information about order fulfillment by the picker, such as background colors or images for display via different frames of a highlight reel, font color, font size, font type, or other instructions specifying how information about order fulfillment by the picker is displayed in one or more frames. Different frames of a template may have different instructions for displaying information, allowing different frames to differently display information.

As further described below in conjunction with FIGS. 3 and 4, to generate a highlight reel for a picker, the content presentation module 210 selects a template for the highlight reel and retrieves information describing order fulfillment associated with the picker from the data store 240. In various embodiments, the content presentation module 210 selects a template for a picker based on one or more characteristics of the picker, with different templates associated with different sets of characteristics. Hence, the content presentation module 210 selects a template associated with a set of characteristics having at least a threshold amount of characteristics satisfied by characteristics of the picker. This allows the content presentation module 210 to customize content displayed by the highlight reel for the picker based on characteristics of the picker.

The content presentation module 210 generates one or more prompts for a generative model based on the retrieved information describing order fulfillment by the picker and on a selected template. As further described below in conjunction with FIGS. 3 and 4, a prompt may include a subset of information describing order fulfillment stored in association with a picker and one or more criteria for information describing order fulfillment by the picker. Different prompts may be generated for different frames of a highlight reel to provide content for each frame of the highlight reel. Based on a received prompt, the generative model outputs content for inclusion in a frame of the highlight reel corresponding to the received prompt. In various embodiments, a generative model is a large language model. For example, a generative model may be a generative pre-trained transformer model (GPTs) in various embodiments. The generative model outputs text content including a portion of the information describing order fulfillment associated with the picker included in a prompt in some embodiments, such as portion of the information describing order fulfillment satisfying one or more criteria included in the prompt. Additionally or alternatively, the generative model outputs one or more images based on a subset of the information describing order fulfillment associated with the picker included in a prompt. In some embodiments, the content presentation module 210 generates a prompt for each frame included in a template and generates the highlight reel by including the content from the generative model in response to a prompt in a corresponding frame. The content presentation module 210 transmits the highlight reel to a picker client device 110 for presentation to a picker, as further described below in conjunction with FIGS. 3 and 4.

The order management module 220 manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross-entropy loss function. The machine learning training module 230 updates the set of parameters for the machine learning model based on the score generated by the loss function. For example, the machine learning training module 230 may apply gradient descent to update the set of parameters.

In various embodiments, the machine learning training module 230 tunes one or more generative models that receive a text prompt and generate content based on the text prompt. The generative model may generate text in response to a text prompt in various embodiments. Alternatively or additionally, the generative model selects or generates an image in response to a text prompt. A generative model is a large language model previously trained on a text corpus to output text in response to a text prompt from a user. As another example, a generative model is a generative image model previously trained on a corpus of images to output an image in response to a received text prompt. For example, a generative model may be a generative pre-trained transformer model (GPT) in various embodiments. In various embodiments, the machine learning training model 230 generates supplemental examples including examples of outputs in response to various prompts. In various embodiments, a supplemental example includes output text or an output image. For example, the machine learning training model 230 generates a GPT index including embeddings corresponding to each supplemental example to facilitate identification and retrieval of one or more supplemental examples. The machine learning training model 230 stores the GPT index including the supplemental examples, or the embeddings for the supplemental examples in various embodiments.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 3:
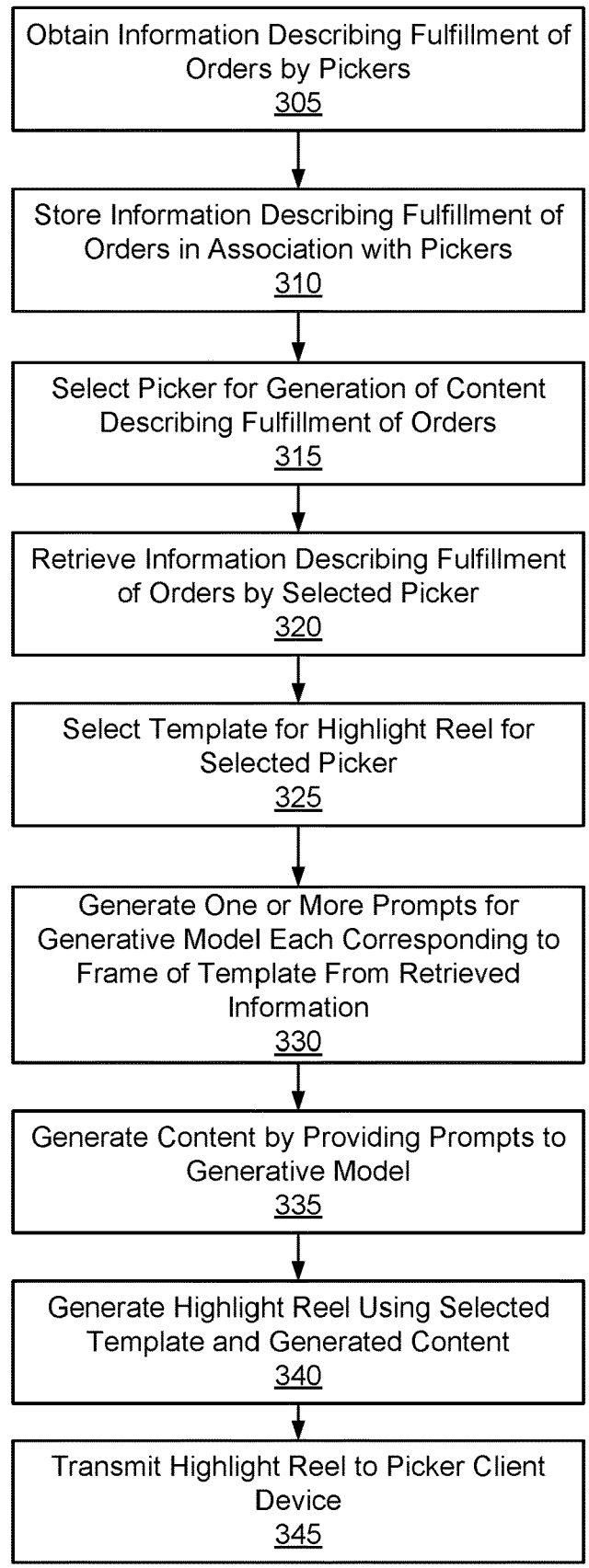
FIG. 3 is a flowchart of a method for generating personalized content describing prior order fulfillment by a picker using a generative model, in accordance with one or more embodiments.

FIG. 3 is a flowchart of a method for generating a summary interface describing order fulfillment by a picker using a generative model, in accordance with some embodiments. Alternative embodiments may include more, fewer, or different steps from those illustrated in FIG. 3, and the steps may be performed in a different order from that illustrated in FIG. 3. These steps may be performed by an online concierge system (e.g., online concierge system 140); however, in other embodiments, the steps may be performed by another type of online system. Additionally, each of these steps may be performed automatically by the online concierge system 140 without human intervention.

An online system, such as an online concierge system 140, receives orders from customers and allocates orders to pickers, who obtain items included in an order from a retailer identified by the order. A picker fulfills an order by delivering items from the order to the customer from whom the order was received. As pickers fulfill orders, the online concierge system 140 obtains 305 information describing order fulfillment of an order by a picker and stores the obtained information in association with the picker who fulfilled the order. Example information describing order fulfillment by the picker includes: items included in an order fulfilled by the picker, a number of items included in the order fulfilled by the picker, item categories of items included in the order fulfilled by the picker, a retailer from which the picker fulfilled the order, a geographic region in which the picker fulfilled the order, or other information describing the order. Information describing order fulfillment by the picker additionally includes information describing the customer's reaction to fulfillment of the order by the picker. Example information describing the customer's reaction to fulfillment of the order by the picker includes a rating the customer provided to the picker for fulfilling the order, a comment the customer provided about eh picker fulfilling the order, or other feedback the online concierge system 140 received about fulfillment of the order by the picker.

The online concierge system 140 stores 310 various information describing order fulfillment by a picker in association with the picker. For example, the online concierge system 140 stores 310 information describing order fulfillment in association with a picker identifier uniquely identifying a picker. In some embodiments, the online concierge system 140 stores 310 information describing order fulfillment in association with an order identifier and stores the order identifier in association with a picker identifier of the picker who fulfilled the order, simplifying subsequent retrieval of order fulfillment information associated with the picker.

As pickers fulfill orders for the online concierge system 140 over time, the online concierge system 140 leverages stored information describing order fulfillment to provide content to different pickers recognizing one or more achievements by a picker fulfilling orders. For example, the online concierge system 140 generates content personalized for a picker based on the information describing order fulfillment stored 310 in association with the picker. In various embodiments, the online concierge system 140 selects 315 a picker for generating content based on stored information describing fulfillment of orders by the picker. The online concierge system 140 may select 315 the picker at a specific time. For example, the online concierge system 140 selects 315 the picker at a specific time of year. In some embodiments, the online concierge system 140 selects 315 each picker at a specific time of year to provide content to a picker based on orders fulfilled by the picker within a time interval, such as within a year, of the specific time of year. As another example, the online concierge system 140 selects 315 the picker at a periodic interval, such as each month or each year. In various embodiments, the online concierge system 140 selects 315 a picker after the periodic interval lapses from a prior time when the online concierge system 140 generated content describing order fulfillment by the picker.

In various embodiments, the online concierge system 140 selects 315 the picker in response to characteristics of the picker satisfying one or more criteria. For example, the online concierge system 140 selects 315 the picker in response to a model maintained by the online concierge system 140 determining the picker has less than a threshold probability of fulfilling subsequent orders for the online concierge system 140 within a particular time interval. As another example, the online concierge system 140 selects 315 a picker in response to determining the picker has performed less than a threshold amount of interaction with the online concierge system during a time interval. For example, the online concierge system 140 selects 315 a picker in response to determining the picker has spent less than a threshold amount of time fulfilling orders within a particular time interval or has fulfilled less than a threshold number of orders within the particular time interval. As another example, the online concierge system 140 selects 315 a picker in response to the online concierge system 140 receiving a specific type of feedback about the picker from customers or in response to receiving a threshold amount of the specific type of feedback about the picker from customers. For example, the online concierge system 140 selects 315 a picker in response to receiving a rating for the picker fulfilling an order that is less than a threshold rating.

The online concierge system 140 retrieves 320 stored information describing order fulfillment by the selected picker. In some embodiments, the online concierge system 140 retrieves 320 information associated with the selected picker describing order fulfillment by the picker within a specific time interval, such as within the specific time interval prior to selecting 315 the selected picker. For example, the online concierge system 140 retrieves 320 information describing fulfillment of orders by a selected picker during a year prior to selection of the picker. As another example, the online concierge system 140 retrieves 320 information describing fulfillment of orders by the selected picker during a month prior to selection of the picker. In various embodiments, the online concierge system 140 retrieves 320 information describing fulfillment of orders by the selected picker during the specific time interval and during an extended time interval that is longer than the specific time interval. For example, the extended time interval is a length of time that the picker has fulfilled orders for the online concierge system 140.

Additionally, the online concierge system 140 selects 325 a template for the content generated for the selected picker. In various embodiments, the content is a highlight reel describing prior order fulfillment by the selected picker, and a template identifies information included in the highlight reel and an order in which the highlight reel displays different information. In various embodiments, a template includes one or more frames, with each frame displaying different information describing order fulfillment, and an order in which frames in the template are displayed. The online concierge system 140 maintains multiple templates in various embodiments, with different templates specifying different information included in a highlight reel and different orders in which the highlight reel displays information describing order fulfillment. For example, a template displays a first set of information about order fulfillment to the selected picker, while an alternative template displays a second set of information about order fulfillment to the selected picker, with the second set of information at least partially differing from the first set of information. As another example, a template displays a set of information about order fulfillment to the selected picker in a specific order, while an alternative template displays the set of information about order fulfillment to the selected picker in an alternative order differing from the specific order.

In various embodiments, the online concierge system 140 associates different templates with different sets of characteristics of pickers. The online concierge system 140 compares characteristics of the selected picker to sets of characteristics of pickers associated with various templates and selects 325 a template associated with a set of characteristics including at least a threshold amount of characteristics matched by characteristics of the selected picker. This allows the online concierge system 140 to select 325 different templates for different pickers based on the corresponding characteristics of pickers. Leveraging characteristics of pickers to select 325 a template for a highlight reel, or other content, allows the online concierge system 140 to tailor displayed information about order fulfillment to the selected picker, increasing relevance of the information included in the highlight reel to the selected picker. For example, the online concierge system 140 selects 325 a template for the selected picker associated with a range of durations for fulfilling orders including a length of time the selected picker has fulfilled orders for the online concierge system 140. As another example, the online concierge system 140 selects 325 a template for the selected picker that is associated with a geographic region matching, or including, a geographic region associated with the selected picker. In another example, the online concierge system 140 selects 325 a template for the selected picker associated with a range of ratings received from customers for order fulfillment including an average rating received from customers for the selected picker.

Based on the selected template and retrieved 320 information describing fulfillment of orders by the selected picker, the online concierge system 140 generates 330 one or more prompts for a generative model. In various embodiments, the online concierge system 140 generates 330 a different prompt for each frame in the selected template, so different prompts correspond to content displayed by different frames of the selected template. A prompt includes at least a subset of the retrieved 320 information describing fulfillment of orders by the selected picker in various embodiments. For example, a prompt includes a request for the generative model with one or more fields in which a subset of the retrieved 320 information describing fulfillment of orders by the selected picker are included.

In various embodiments, a prompt includes a subset of information describing order fulfillment by the selected picker and one or more criteria for content based on the subset of information describing order fulfillment. For example, a prompt includes items included in orders fulfilled by the selected picker during a specific time interval and a criterion to identify an item with a maximum aggregated quantity in orders fulfilled by the selected picker during the specific time interval. As another example, a prompt includes ratings received from customers for orders fulfilled by the selected picker during the specific time interval and a criterion to generate content including ratings having at least a threshold value. In another example, a prompt includes orders fulfilled by the selected picker during the specific time interval and a criterion for content identifying a total number of items obtained during the specific time interval or a total number of orders fulfilled during the specific time interval.

Generating different prompts for different frames of the selected template allows the online concierge system 140 to include different content about the retrieved 320 information describing fulfillment of orders by the selected picker in a highlight reel, or other content, based on the template. For example, the generative model generates content based on a number of orders fulfilled by the selected picker during a specific time interval for a frame and generates alternative content based on ratings received for order fulfillment during the specific time interval for an additional frame. As another example, the generative model generates content based on a number of retailers from which the selected picker fulfilled orders during the specific time interval for a frame and generated additional content based on an item that the selected picker obtained most frequently during the specific time interval for another frame. Generating different prompts allows the online concierge system 140 to have the generative model generate a variety of content describing order fulfillment by the selected picker, leveraging the generative model to create content based on different stored information describing order fulfillment by the selected picker.

In response to receiving a generated prompt as input, the generative model generates 335 content for inclusion in at least one frame of the template. In various embodiments, a generative model is a large language model previously trained using a text corpus or an image corpus. For example, a generative model is a generative pre-trained transformer model (GPT) in various embodiments. The generative model generates 335 content at least partially based on the subset of the retrieved 320 information describing fulfillment of orders by the selected picker. For example, the generated content includes one or more portions of the subset of retrieved 320 information describing fulfillment of orders by the selected picker selected by the generative model based on one or more criteria included in the prompt. In various embodiments, the online concierge system 140 uses different generative models to generate 335 different types of content. For example, a generative model generates 335 text data for inclusion in a frame of a template, while another generative model generates 335 one or more images for inclusion in a frame of a template.

Based on the generated content for each frame of the selected template, the online concierge system 140 generates 340 a highlight reel for the selected picker. In other embodiments, the online concierge system 140 generates 340 another type of summary interface based on the selected template and the generated content. The highlight reel includes multiple frames specified by the selected template that are displayed in an order specified by the selected template. Each frame includes corresponding content generated 335 by the generative model, so the highlight reel presents different information about prior fulfillment of orders by the selected picker. For example, each frame includes content generated 335 by the generative model in response to a generated prompt corresponding to a frame. In various embodiments, the highlight reel displays individual frames in the order specified by the selected template. Further, the selected template includes instructions describing formatting of each frame of the highlight reel. Example instructions for formatting include instructions specifying: a background of each frame, a style with which text is displayed on each frame, images displayed on each frame, or other instructions describing display or presentation of content via the highlight reel.

In various embodiments, one or more frames of the selected template include thresholds for various information about order fulfillment by the selected picker. The online concierge system 140 compares a portion of the information describing order fulfillment by the selected picker included in the content generated 335 by the generative model for the frame to a threshold included in the frame. In some embodiments, the online concierge system 140 omits a frame from the highlight reel in response to the portion of the stored information about prior fulfillment of orders by the selected picker in the content generated 335 for the frame being less than the threshold. In such embodiments, the highlight reel generated 340 by the online concierge system 140 does not include the frame for which the portion of the stored information about fulfillment of orders by the selected picker in the content generated 330 for the frame does not equal or exceed the threshold. Alternatively, in response to the portion of the stored information about prior fulfillment of orders by the selected picker in the content generated 335 for the frame being less than the threshold included in the frame, the online concierge system 140 omits the content generated 335 for the frame by the generative model from the frame, but includes the frame in the highlight reel. This limits information about fulfillment of orders by the selected picker included in the highlight reel to information describing positive accomplishments or significant accomplishments of the selected picker. For example, the online concierge system 140 omits ratings about the selected picker less than a threshold rating from a frame of the highlight reel. As another example, the online concierge system 140 omits an item that the selected picker obtained less than a threshold number of times from a frame of the highlight reel.

The online concierge system 140 transmits 345 the highlight reel to a picker client device 110 of the selected picker. The picker client device 110 displays the highlight reel to the selected picker. For example, the picker client device 110 displays the highlight reel in response to receiving a specific input from the selected picker. In various embodiments, the picker client device 110 transmits information describing interactions by the selected picker with the highlight reel to the online concierge system 140. For example, the picker client device 110 transmits information to the online concierge system 140 identifying a length of time the selected picker viewed different frames of the highlight reel. As another example, the picker client device 110 transmits information to the online concierge system 140 indicating whether the selected picker stored a frame of the highlight reel or transmitted a copy of the frame to one or more other pickers or to another system. In another example, the picker client device 110 transmits an identifier of each frame of the highlight reel that the selected picker viewed for at least a threshold amount of time to the online concierge system 140.

In various embodiments, the online concierge system 140 receives information describing interactions with the highlight reel by the selected picker and modifies generation of one or more subsequent prompts for the generative model based on the selected picker's interactions with the highlight reel. For example, in response to received information indicating the selected picker viewed a frame for at least a threshold amount of time, the online concierge system 140 stores a positive label for a prompt generated for the frame, increasing a likelihood of a subsequently generated prompt having at least a threshold measure of similarity to the prompt. Alternatively, in response to receiving information indicating the selected picker viewed a frame for less than an additional threshold amount of time, the online concierge system 140 stores a negative label for a prompt generated for the frame to reduce a likelihood of the online concierge system 140 generating subsequent prompt with at least a threshold measure of similarity to the prompt. As another example, the online concierge system 140 stores a positive label in association with a prompt in response to received information indicating the selected picker stored a frame for which the prompt was generated 330 or sent a copy of the frame for which the prompt was generated 330 to another online system or another picker. Storing labels in association with generated prompts based on information describing interactions by the selected picker with frames corresponding to the generated prompts allows the online concierge system 140 to refine generation of prompts for the highlight reel that accounts for how pickers interact with prompts.

Figure 4:
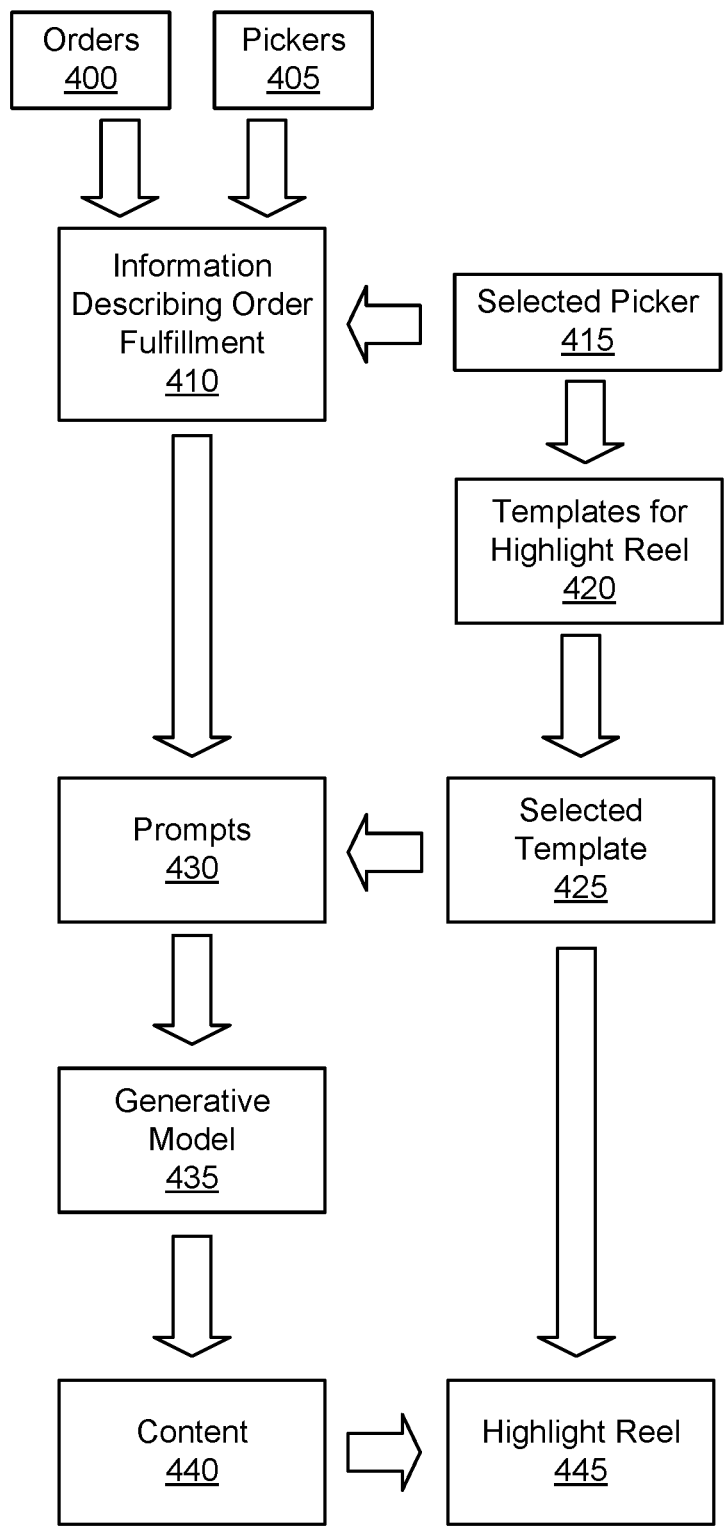
FIG. 4 is a process flow diagram of a method for generating personalized content describing prior order fulfillment by a picker using a generative model, in accordance with one or more embodiments.

FIG. 4 is a process flow diagram of one or more embodiments of a method for generating a highlight reel describing order fulfillment by a picker using a generative model. An online concierge system 140 receives various orders 400 from customers. Each order 400 includes one or more items, identifies a retailer from which the one or more items are to be obtained, and a location for delivering the one or more items included in the order. Further, each order 400 is associated with a customer from whom the order 400 was received.

The online concierge system 140 allocates different orders 400 to various pickers 405. A picker 405 to whom an order 400 is allocated obtains items included in the order 400 from a retailer identified by the order 400 and delivers the obtained items to a location specified by the order. The online concierge system 140 stores information 410 describing order fulfillment of an order 400 in association with a picker 405 who fulfilled the order 400. For example, the online concierge system 140 may store: items included in the order 400 fulfilled by the picker 405, a number of items included in the order 400 fulfilled by the picker 405, item categories of items included in the order 400 fulfilled by the picker 405, a retailer from which the picker 405 fulfilled the order 400, a geographic region in which the picker 405 fulfilled the order 400, or other information describing the order 400. Additionally, information 410 describing order fulfillment by the picker includes information describing a customer's reaction to fulfillment of the order 400 by the picker 405. Example information describing the customer's reaction to order fulfillment by a picker 405 includes a rating the customer provided the picker 405 for fulfilling the order, a comment the customer provided about the picker 405 fulfilling the order 400, or other feedback from the customer about order fulfillment by the picker 405.

As a number of orders received by the online concierge system 140 increases, pickers 405 fulfill a greater number of orders and a greater number of pickers 405 fulfill orders for the online concierge system 140. Increasing a number of orders fulfilled and increasing a number of pickers fulfilling orders increases an amount of information 410 describing order fulfillment stored by the online concierge system 140 for pickers. To maintain engagement with the online concierge system 140 by pickers 405, the online concierge system 140 provides content to pickers 405 about order fulfillment by the pickers 405. Content about order fulfillment by a picker 405 may identify significant achievements by a picker 405 when fulfilling orders to provide the picker 405 with positive feedback that entices the picker 405 to continue fulfilling orders for the online concierge system 140 or to fulfill a greater number of orders 400 for the online concierge system 140.

In various embodiments, the content provided to a picker 405 by the online concierge system 140 is a highlight reel displaying different portions of the information 410 describing order fulfillment stored in association with a picker 405. The online concierge system 140 selects a picker 405 and generates a highlight reel for the selected picker 415. In various embodiments, the online concierge system 140 selects a picker 405 at a specific time or in response to characteristics associated with the picker 405 satisfying one or more criteria. For example, the online concierge system 140 selects a picker 405 on a specific date. In another example, the online concierge system 140 selects a picker 405 in response to at least a threshold time interval lapsing from prior generation of a highlight reel for the picker 405. As another example, the online concierge system 140 selects a picker 405 at a periodic interval (e.g., selects the picker 405 each month, selects the picker 405 each year, etc.).

In various embodiments, the online concierge system 140 selects a picker 405 in response to characteristics of the picker 405 satisfying one or more criteria. For example, the online concierge system 140 selects the picker 405 in response to a model determining the picker 405 has less than a threshold probability of fulfilling subsequent orders within a specific time interval. As another example, the online concierge system 140 selects a picker 405 in response to determining the picker 405 has performed less than a threshold amount of interaction with the online concierge system 140 during a time interval. For example, the online concierge system 140 selects a picker 405 in response to determining the picker has spent less than a threshold amount of time fulfilling orders within a time interval. As another example, the online concierge system 140 selects a picker 405 in response to the online concierge system 140 receiving a specific type of feedback about the picker 405 from customers or in response to receiving a threshold amount of the specific type of feedback about the picker from customers.

To generate the highlight reel for the selected picker 415, the online concierge system 140 maintains a set of templates 420 for the highlight reel in various embodiments. Each template 420 includes one or more frames, with each frame displaying a portion of information 410 describing order fulfillment stored in association with the picker 405, and an order in which the frames are displayed. Different frames display different portions of information 410 describing order fulfillment stored in association with the picker 405 in various embodiments. Different templates 420 include frames with different portions of information 410 describing order fulfillment stored in association with the picker 405, or different templates 420 display frames in different orders. Maintaining different templates 420 allows the online concierge system 140 to vary how information 410 describing order fulfillment is displayed to a picker 405 or to different pickers 405.

As further described above in conjunction with FIGS. 2 and 3, a template 420 may have one or more frames including a corresponding threshold. Different templates 420 may have different thresholds for information 410 describing order fulfillment stored in association with a picker 405. In various embodiments, the online concierge system 140 determines whether a portion of the information 410 describing order fulfillment stored in association with a picker 405 for display in a frame equals or exceeds the threshold included in the frame. In response to determining the portion of the information 410 describing order fulfillment stored in association with a picker 405 for display in a frame is less than a threshold included in the frame, the online concierge system 140 may omit the frame from a generated highlight reel or may omit the portion of the information 410 describing order fulfillment stored in association with a picker 405 for display in the frame from the generated highlight reel. This allows the online concierge system 140 to limit information 410 describing order fulfillment stored in association with the picker 405 included in a highlight reel to information 410 describing order fulfillment exceeding corresponding thresholds.

In various embodiments, the online concierge system 140 associates a set of characteristics of a picker 405 with each stored template 420. Different sets of characteristics are associated with different templates 420 in various embodiments. For example, a template 420 is associated with a particular time interval that a picker 405 has fulfilled orders for the online concierge system 140, while an alternative template 420 is associated with an alternative time interval that the picker 405 has fulfilled orders for the online concierge system 140. As another example, a template 420 is associated with a particular geographic location, while an alternative template 420 is associated with a different geographic location. This allows the online concierge system 140 to select different templates 420 for different pickers 405 based on corresponding characteristics of a picker 405, tailoring content included a highlight reel based on characteristics of the picker 405. The online concierge system 140 selects a template 420 for the selected picker 415 that is associated with a set of characteristics including at least a threshold amount of characteristics matched by characteristics of the selected picker 415. As another example, the selected template 420 is associated with a set of characteristics including a maximum amount of characteristics matched by characteristics of the selected picker 415.

As a number of pickers 405 fulfilling orders 400 increases, creating content for a highlight reel that is personalized to a picker 405 is increasingly time consuming. To efficiently generate content personalized for the selected picker 415, the online concierge system 140 generates one or more prompts 430 for a generative model 435. The generative model 435 generates content 440 for inclusion in a highlight reel based on information 410 describing order fulfillment by the selected picker 415 based on the generated prompt 430. In various embodiments, the generative model 435 is a large language model trained on a text corpus or is a generative image model trained on a corpus of images.

As further described above in conjunction with FIG. 3, a prompt 430 includes a subset of the information 410 describing order fulfillment by the selected picker 415 from which the generative model 435 generates content 440. The prompt 430 may include one or more embeddings representing the subset of the information 410 describing order fulfillment by the selected picker 415 in some embodiments. In various embodiments, a prompt 430 includes one or more criteria for content and a subset of information 410 describing order fulfillment by the selected picker 415, and the generative model 435 generates content 440 based on the subset of information 410 describing order fulfillment by the selected picker 415 included in the prompt 430 subject to the one or more criteria included in the prompt 430. For example, a prompt includes feedback received from customers for the selected picker 415 and criteria to select the most positive feedback. As another example, a prompt 430 includes orders fulfilled by the selected picker 415 during a specific time interval and criteria to select an item included in a maximum number of the included orders or to select an item obtained a maximum number of times.

In various embodiments, the content 440 generated by the generative model 435 is text including a portion of the information 410 describing order fulfillment by the selected picker 415. For example, the content 440 is text including a portion of the information 410 describing order fulfillment by the selected picker 415 satisfying one or more criteria included in a prompt 430. As another example, the content 440 generated by the generative model 435 is an image based on the subset of information 410 describing order fulfillment by the selected picker 415 included in the prompt 430. Generating different prompts 430 for different frames in the selected template 425 allows inclusion of different portions of the information 410 describing order fulfillment by the selected picker 415 in the highlight reel. Additionally, leveraging the generative model 435 to generate content 440 for the highlight reel allows the online concierge system 140 to generate content 440 more efficiently, enabling the online concierge system 140 to generate content 440 for highlight reels for a greater number of pickers 405.

From the content 440 generated by the generative model 435 and the selected template 425, the online concierge system 140 generates the highlight reel 445 for the selected picker 415. When generating the highlight reel 445, the online concierge system 140 includes content 440 generated based on a prompt 430 for a frame of the selected template 425 in the frame of the selected template 425, which populates frames of the selected template 425 with corresponding generated content 440. For a frame of the selected template 425 including a threshold, the online concierge system 140 compares the portion of the information 410 describing order fulfillment by the selected picker 415 in the content 440 for the frame to the threshold. In response to the portion of the information 410 describing order fulfillment by the selected picker 415 in the content 440 for the frame being less than the threshold, the online concierge system 140 omits the frame from the highlight reel 445 or omits the portion of the information 410 describing order fulfillment by the selected picker 415 from the frame. Hence, thresholds included in various frames of the selected template 425 allow the online concierge system 140 to customize content 440 displayed by the highlight reel 445. Such customization causes the highlight reel 445 to display portions of the information 410 describing order fulfillment by the selected picker 415 representing significant or positive occurrences from order fulfillment. This allows the highlight reel 445 to provide the selected picker 415 with encouragement to continue fulfilling orders for the online concierge system 140 based on prior fulfillment of orders 400 by the selected picker 415, increasing a likelihood of the selected picker 415 fulfilling additional orders for the online concierge system 140.

Figure 5:
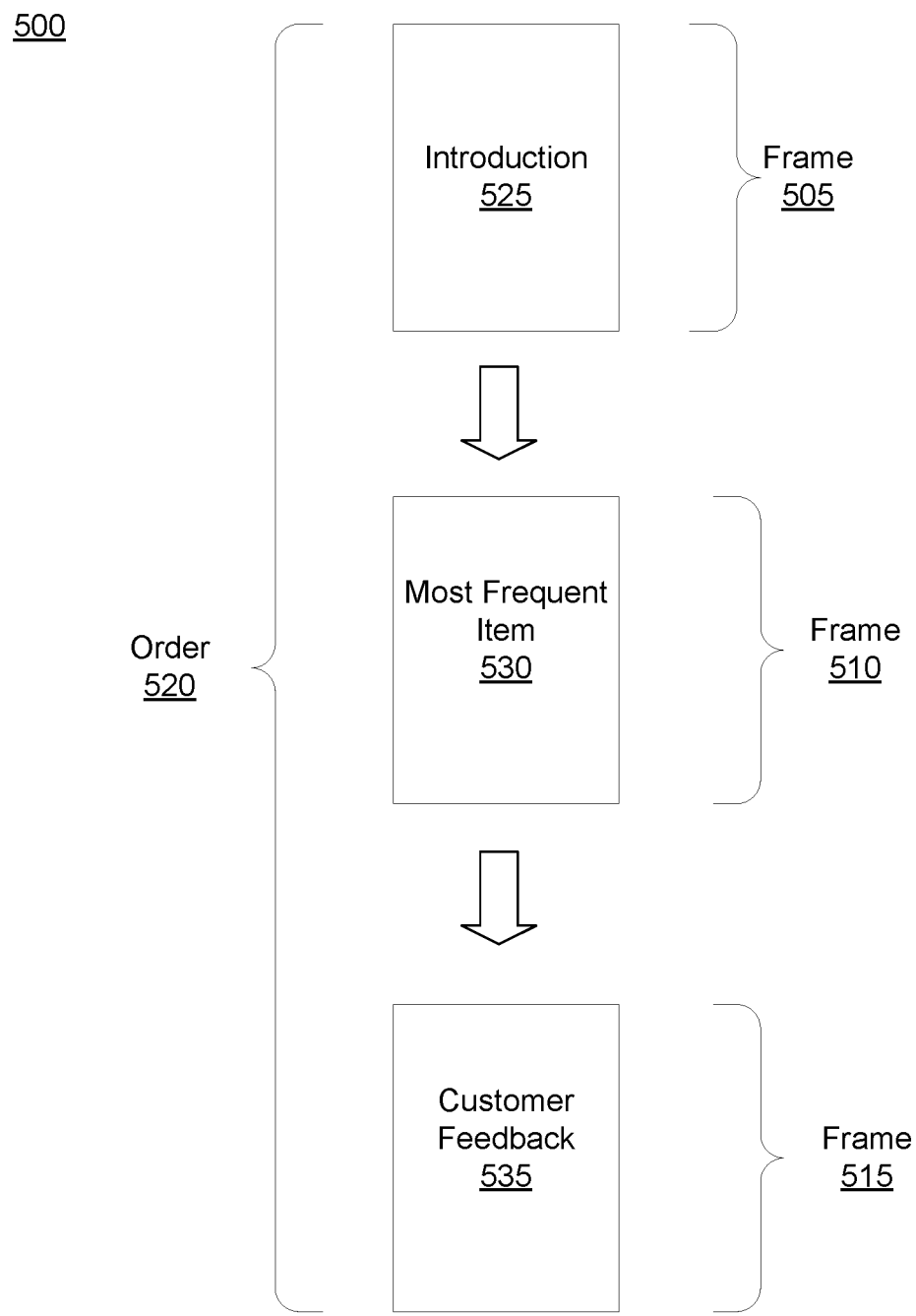
FIG. 5 is an example highlight reel describing order fulfillment by a picker, in accordance with one or more embodiments.

FIG. 5 is an example highlight reel 500 describing order fulfillment by a picker. In the example of FIG. 5, the highlight reel 500 includes frame 505, frame 510, and frame 515. Further, the highlight reel 500 specifies an order 520 in which the frames are displayed to a picker. In the example of FIG. 5, the order 520 specifies displaying frame 505 first, frame 510 second, and third frame 515. While FIG. 5 shows an example where the highlight reel 500 includes three frames, in other embodiments, the highlight reel may include a different number of frames.

Each frame displays different content to a picker. In the example of FIG. 5, frame 505 displays an introduction 525 to a picker. For example, the introduction 525 identifies a name of the picker, and may include an image of the picker, as well as a description of a time interval from which content included in the highlight reel 500 was obtained. Various information may be included in the introduction 525 in various embodiments.

Subsequent to frame 505, frame 510 displays content identifying an item 530 most frequently obtained by the picker. In some embodiments, the item 530 most frequently obtained by the picker is an item included in a maximum number of orders fulfilled by the picker during a time interval. Alternatively, the item 530 most frequently obtained by the picker of which the picker obtained a maximum quantity during the time interval. Frame 510 may include multiple items in some embodiments, such as items having at least a threshold position in a ranking of items obtained by the picker during the time interval based on frequency.

Subsequent to frame 510, frame 515 displays feedback 535 received from customers about order fulfillment by the picker during the time interval. For example, the feedback 535 includes one or more ratings of the picker received from customers during the time interval. In various embodiments, frame 515 includes a threshold rating, so feedback 535 included in frame 515 includes ratings equaling or exceeding the threshold rating. Including a threshold in frame 515 limits the customer feedback 535 displayed by frame 515 to ratings having at least a threshold value, so the highlight reel 500 displays positive feedback 535 to the picker. In other embodiments, frame 515 includes different or alternative types of feedback 535 about the picker, such as messages to the picker from customers.

In various embodiments, background audio is presented to the picker while frames of the highlight reel 500 are displayed. Different background audio may be played for different frames, with a template corresponding to the highlight reel 500 identifying background audio for different frames. Further, a template corresponding to the highlight reel 500 may identify background images or formatting for different frames, as well as a format in which one or more frames display content to a picker.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "of" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a non-transitory computer readable medium, comprising:
    storing, at the computer system, information describing historical order fulfillments by each of a plurality of pickers;
    accessing, by the computer system, one or more templates for a highlight reel, wherein each template for a highlight reel includes one or more frames describing a picker's previous fulfillment of orders and one or more fields for inserting specific information about the picker's historical order fulfillments in the one or more of the frames of the template;
    selecting, by the computer system, a picker from the plurality of pickers;
    selecting a template for the selected picker based on one or more characteristics of the selected picker;
    retrieving the information describing historical order fulfillments by the selected picker;
    prompting a generative model to generate, based on the retrieved information describing historical order fulfillments by the selected picker, a value for each of the one or more fields for inserting specific information about the picker's historical order fulfillments in the one or more of the frames of the template;
    generating the highlight reel for the selected picker, by inserting into the one or more fields of the one or more frames include the generated values from the generative model; and
    transmitting the highlight reel from the computer system to a picker client device of the selected picker, wherein the transmitting causes the picker client device to display the highlight reel.

2. The method of claim 1, wherein selecting a template comprises selecting a template having one or more frames that include corresponding thresholds for information describing order fulfillment by the picker.

3. The method of claim 2, wherein generating the highlight reel for the selected picker comprises:
    determining that a particular value generated by the generative model is less than a corresponding threshold; and
    in response to determining that a particular value generated by the generative model is less than a corresponding threshold, omitting a frame from the highlight reel, wherein the omitted frame contains a field corresponding to the particular value.

4. The method of claim 1, wherein selecting a template for the selected picker based on one or more characteristics of the selected picker comprises:
    selecting a template associated with a set of characteristics of pickers having at least a threshold amount of characteristics matching the one or more characteristics of the picker.

5. The method of claim 1, wherein selecting a template for the selected picker based on one or more characteristics of the selected picker comprises selecting a template that specifies a different portion of the information describing order fulfillment by the picker displayed on different frames and an order in which different frames are displayed.

6. The method of claim 1, wherein prompting a generative model comprises prompting a generative model to generate text data based on the information describing historical order fulfillments.

7. The method of claim 1, wherein prompting a generative model comprises prompting a generative model to generate an image based on the information describing historical order fulfillments.

8. The method of claim 1, wherein selecting a picker comprises selecting a picker having characteristics satisfying one or more criteria.

9. The method of claim 1, further comprising:
receiving, at the computer system, information from the picker client device describing interaction by the selected picker with a frame of the highlight reel; and
storing a label in association with a prompt generated for the frame of the highlight reel based on the information describing interaction by the selected picker with the frame of the highlight reel.

10. A computer program product comprising a non-transitory computer readable storage medium having instructions encoded thereon that, when executed by a processor, cause the processor to perform steps comprising:
storing information describing historical order fulfillments by each of a plurality of pickers;
accessing, by the computer system, one or more templates for a highlight reel, wherein each template for a highlight reel includes one or more frames describing a picker's previous fulfillment of orders and one or more fields for inserting specific information about the picker's historical order fulfillments in the one or more of the frames of the template;
selecting, by the computer system, a picker from the plurality of pickers;
selecting a template for the selected picker based on one or more characteristics of the selected picker;
retrieving the information describing historical order fulfillments by the selected picker;
prompting a generative model to generate, based on the retrieved information describing historical order fulfillments by the selected picker, a value for each of the one or more fields for inserting specific information about the picker's historical order fulfillments in the one or more of the frames of the template;
generating the highlight reel for the selected picker, by inserting into the one or more fields of the one or more frames include the generated values from the generative model; and
transmitting the highlight reel from the computer system to a picker client device of the selected picker, wherein the transmitting causes the picker client device to display the highlight reel.

11. The computer program product of claim 10, wherein selecting a template comprises selecting a template having one or more frames that include corresponding thresholds for information describing order fulfillment by the picker.

12. The computer program product of claim 11, wherein generating the highlight reel for the selected picker comprises:
determining that a particular value generated by the generative model is less than a corresponding threshold; and
in response to determining that a particular value generated by the generative model is less than a corresponding threshold, omitting a frame from the highlight reel, wherein the omitted frame contains a field corresponding to the particular value.

13. The computer program product of claim 10, wherein selecting a template for the selected picker based on one or more characteristics of the selected picker comprises:
selecting a template associated with a set of characteristics of pickers having at least a threshold amount of characteristics matching the one or more characteristics of the picker.

14. The computer program product of claim 10, wherein selecting a template for the selected picker based on one or more characteristics of the selected picker comprises selecting a template that specifies a different portion of the information describing order fulfillment by the picker displayed on different frames and an order in which different frames are displayed.

15. The computer program product of claim 10, wherein prompting a generative model comprises prompting a generative model to generate text data based on the information describing historical order fulfillments.

16. The computer program product of claim 10, wherein prompting a generative model comprises prompting a generative model to generate an image based on the information describing historical order fulfillments.

17. The computer program product of claim 10, wherein selecting a picker comprises selecting a picker having characteristics satisfying one or more criteria.

18. The computer program product of claim 10, wherein the non-transitory computer readable storage medium further has instructions encoded thereon that, when executed by a processor, cause the processor to perform steps comprising:
receiving, at the computer system, information from the picker client device describing interaction by the selected picker with a frame of the highlight reel; and
storing a label in association with a prompt generated for the frame of the highlight reel based on the information describing interaction by the selected picker with the frame of the highlight reel.

19. A system comprising:
a processor; and
a non-transitory computer readable storage medium having instructions encoded thereon that, when executed by the processor, cause the processor to perform steps comprising:
storing, at the computer system, information describing historical order fulfillments by each of a plurality of pickers;
accessing, by the computer system, one or more templates for a highlight reel, wherein each template for a highlight reel includes one or more frames describing a picker's previous fulfillment of orders and one or more fields for inserting specific information about the picker's historical order fulfillments in the one or more of the frames of the template;
selecting, by the computer system, a picker from the plurality of pickers;
selecting a template for the selected picker based on one or more characteristics of the selected picker;
retrieving the information describing historical order fulfillments by the selected picker;
prompting a generative model to generate, based on the retrieved information describing historical order fulfillments by the selected picker, a value for each of the one or more fields for inserting specific information about the picker's historical order fulfillments in the one or more of the frames of the template;
generating the highlight reel for the selected picker, by inserting into the one or more fields of the one or more frames include the generated values from the generative model; and transmitting the highlight reel from the computer system to a picker client device of the selected picker, wherein the transmitting causes the picker client device to display the highlight reel.

20. The system of claim 19, wherein selecting a template comprises selecting a template having one or more frames that include corresponding thresholds for information describing order fulfillment by the picker.

\* \* \* \* \*